United States Patent [19]
Fleshman

[11] 3,867,903
[45] Feb. 25, 1975

[54] EGG LAYER SYSTEM
[76] Inventor: Roger L. Fleshman, 103 60 W. 74th Pl., Arvada, Colo. 80005
[22] Filed: Sept. 11, 1973
[21] Appl. No.: 396,292

[52] U.S. Cl.......................... 119/17, 119/22, 119/48
[51] Int. Cl............................................. A01k 31/16
[58] Field of Search .................... 119/17, 18, 22, 48

[56] References Cited
UNITED STATES PATENTS

| | | | |
|---|---|---|---|
| 2,105,058 | 1/1938 | Smith et al. | 119/48 |
| 2,176,814 | 10/1939 | Hawkins | 119/48 |
| 2,612,862 | 10/1952 | Ipsen | 119/18 |
| 3,312,194 | 4/1967 | Ernst | 119/22 |

Primary Examiner—Hugh R. Chamblee
Attorney, Agent, or Firm—James E. Pittenger

[57] ABSTRACT

An egg layer system for the production of poultry eggs which includes a plurality of tiered, open mesh wire cages arranged back to back and mounted in a plurality of rows extending the length of an elongated rectangular building enclosure. The cage rows are arranged so as to form equally spaced aisles between facing cages. At the base of the cage rows is a parallel track assembly provided to permit a servicing carriage assembly to be moved along the individual aisles. A trolley assembly is provided extending transversely across one end of the rows of cages for shifting the carriage assembly between aisles. In addition, the trolley can be arranged to extend beyond the building enclosure to interconnect with similar egg layer systems for interchanging the carriages, as desired. Individual, self-propelled carriages for egg collection, scraping manure dropping boards or maintenance of poultry within the cages are included. A single combined carriage which can simultaneously perform all of these functions can also be provided. The tiered, back-to-back cages are constructed by arranging rows of spaced support columns, alone one side of which is secured a continuous one-piece open mesh wire curtain wall. Transversely extending support arms, vertically spaced, are inserted through the curtain wall and attached to the support columns. Manure dropping boards are supported on the top surfaces of the support arms, and continuous, tilted open mesh wire floors, doors and cage partitions are hung from the cross arms and curtain wall. Any number of tiers of cages can be provided and the rows can be of any length that is desired. A novel door locking clip is provided for securing the cage doors in the down position and supporting the doors when raised to the open position.

10 Claims, 22 Drawing Figures

Fig_1

Fig_4

Fig_5

Fig_3

Fig_6

Fig_7

Fig_9

Fig_10

Fig_11

Fig_12

Fig.12a

Fig_13

Fig_14

Fig_15

Fig_16

Fig_17

Fig_22

Fig_18

Fig_19

Fig_20

Fig_21

EGG LAYER SYSTEM

This invention is directed to an improved egg layer system having a novel cage construction and facilities for servicing the cages during operation. It is more specifically directed to a caged egg layer system where the cages are arranged in back to back fashion, facing aisles formed therebetween and providing carriage service facilities for the collection of eggs, scraping of manure dropping boards and providing access to the individual cages. The cage construction provides complete, efficient use of the enclosing building.

In the past, it has been well known to provide mechanized egg layer systems which provide rows of cages usually built on the floor or elevated from the floor of the building. Aisles were provided between the cages so that an individual could walk between the cages manually collecting eggs or cleaning the cages, as necessary. To increase the efficiency or utilization of the space within the building, it later developed that the cages could be stacked one on top of another to increase the available cage space and number of birds available. Next it was found that the cages could be arranged in tiers whereby the rows of cages would be stacked one on top of the other. In this arrangement, tiers of two, three and four cages high have been common.

With the advent of the tiered poultry cages, many problems were encountered which were not experienced prior to this time. One of these problems was the inability to manually collect the egg production that was increased by the multiple tier arrangement of cages. In addition, the acessibility of the eggs was greatly diminished. Cleanliness of the cages became a major problem in that the droppings from the higher cages would fall upon the lower cages, greatly increasing sanitation problems, with possible necessity of destruction of portions or the entire flock of birds. It is now well known in the prior art to provide continuous manure dropping board shields below each of the higher tiers of cages to maintain the cleanliness of the cages below. In addition, the collection of eggs has been mechanized to automate the handling of the eggs by such means as a conveyor belt to move the eggs from the cages to a processing area.

To alleviate the problem of manure collection, various devices have been suggested in the prior art, such as a scraping bar pulled along the extent of the dropping boards by means of a cable or chain. Usually, these devices are controlled by means of a timing device to automatically move the scrapers along the board at preset time intervals, which never take into account the actual condition or amount of manure present on the dropping boards prior to the initiating of operation.

In another device in the prior art, a double carriage arrangement is provided. The carriage is suspended on rails positioned above a single row of tiered cages in a straddling fashion with legs extending down on both sides of the cage row. Inwardly extending arms having scrapers attached are provided for scraping the dropping boards formed as trays below each tier. The carriage is moved along the entire row of cages by means of a cable, for the length of the building. A hopper and feed chute is provided for filling the feed troughs extending along the front of the cages. A single carriage is provided for each row of cages and no provision is made to shift the carriages from one row to another.

Another device shown in the prior art reveals a carriage pulling a manure cart and mounted on a single rail positioned between rows of cages. A plural tier cage arrangement is disclosed and an upwardly extending structure is provided on the carriage having arms for scraping dropping boards positioned below each tier of cages. The arms are arranged to scrape the dropping boards and direct the manure into the cart carried along in tandem by the carriage.

A circular egg layer system is also known in the prior art. The rows of double cages are arranged in a circular pattern and spaced radially from each other. The entire cage structure is arranged to rotate so that all the cages pass by a radial aisle in which a carriage servicing arrangement for providing food, water, egg collection and manure scraping is provided. The servicing carriage is arranged to be radially positioned so that each circle of cages may be rotated past the servicing carriage, as desired. The major drawback in a system such as this is the extreme size and power required in the structure for rotating and guiding the cages so that they may be serviced as required.

Because of the problems and arrangements stated above as being present in the prior art, it is an object of the present invention to provide an egg layer system which will completely and efficiently utilize the entire volume available within an enclosing structure. This is to say that all of the available space within a conventional structural building can be utilized to provide a maximum production of eggs for the original investment cost in the system.

Another object of the present invention is to provide an egg layer system wherein a minimum amount of manual labor is required for operation of the system. In this way, the cost of the egg production can be held to a bare minimum.

A further object of the present invention is to provide an egg layer system wherein the cages are arranged back to back having a common curtain wall between cages to minimize the cost of erecting the cages.

A still further object of the present invention is to provide an egg layer system wherein the cages may be stacked in tiered relation to any height permitted in the protective enclosure and any length that is desired, the tiered cages being positioned in double elongated rows and, in addition, extending along each side of the inner surface of the building so that cages face both sides of the aisles formed between the cage structures.

A still further object of the present invention is to provide a caged layer system wherein a complete service carriage can be provided to run on parallel rails provided at the base of the cage rows wherein the carriages can be moved down the aisle between the cages for servicing cages on both sides of the aisle simultaneously for the purpose of collecting eggs, scraping manure dropping boards and providing a work access platform for an attendant during the process of installing and removing birds from the cages.

It is a still further object of the present invention to provide a cross trolley arrangement transversely extending across the end of the aisles between cages and the inclusion of an extended track arrangement between similar types of systems whereby carriages can be moved to other systems or interchanged with other systems.

A still further object of the present invention is to provide an egg layer system whereby the cages are constructed in an efficient and time saving manner requiring a minimum amount of material and utilizing common parts between cages wherever possible to provide an efficient and economical cage layer system which provides comfort and protection for the poultry and thus is capable of a high egg production rate and reducing the overall cost of the production of eggs.

The present invention is directed to an egg layer system wherein double cages are generally arranged in a back to back, tiered arrangement extending in a plurality of rows. The cages in each row are positioned in a plurality of tiers stacked one above the other to any height available within the enclosed building. A row of tiered single is provided along each sidewall of the building, so that all available space in the building is utilized. Servicing carriages are provided to run on parallel rails provided at the base of the cage rows for egg collection, manure dropping board scraping, and installing and removing birds from the cages.

In one embodiment of the invention, an open pit area is provided below the cages, and the cages are supported on elevated structural members. The supporting beams upon which the cage support columns are mounted have an enlarged upper flange which forms the rails for supporting the servicing carriage which is arranged to pass down each of the aisles between the cages. The manure is scraped into the pit and allowed to be stored where it is dried and remains until a sufficient accumulation is obtained to necessitate removal.

In another embodiment, double-T, prestressed concrete members are inverted on a flat surface to provide the base for the support columns of the cages and, in turn, the upwardly extending legs of the T's form the rails for the servicing carriage.

A trolley arrangement is provided extending transversely across one end of the building adjacent to the end of the aisles between the cages. The self-propelled servicing carriage is moved upon the trolley when it is aligned with the aisle in which the carriage is located. The trolley can then be repositioned into alignment with any one of the succeeding aisles, either by means of a cable pulling arrangement, a power unit attached to the trolley and arranged to move the trolley laterally along the building, or an arrangement can be provided whereby the power of the carriage can be transferred so as to drive the trolley in a lateral direction into alignment with the next aisle. It is also possible, with the present invention, that the trolley can be arranged to extend through the sidewalls of the building and interconnect with other similar egg layer systems, thus permitting the carriage assemblies to be moved from one system to another, thus greatly improving the efficiency of the systems and permitting operation even if several carriages are out of operation for repair or maintenance.

In the present egg layer system, the cages are constructed in a very novel arrangement. Vertically extending cage support columns are arranged in an elongated row running the length of the enclosure building. The columns, usually of a rectangular tubular box construction, are open at the top and interconnected by lateral and longitudinal support members which include a lip and slot at the ends which permit them to be positioned down over the upper lip of the support columns. The longitudinal support members extending between columns include upwardly extending hooks at one side of their vertical L-shaped cross section for suspending a curtain wall thereon.

An open wire mesh curtain wall is arranged to extend downwardly along one side of the row of columns and attached in a tightly stretched arrangement by means of a horizontal rail provided near the base of the columns. The cages are then formed on each side of this wire mesh curtain wall to form a convenient back to back arrangement. Cross arms are inserted through the wire wall in vertically spaced arrangement along each support column and attached to the column. A convenient slotted arrangement at the outer ends of the cross support arms is included for attaching a longitudinal support rod the entire length of the cage row. A downwardly and outwardly arranged dropping board is provided continuously along the top of each of the tiers of cross support arms. The cage floors are wire mesh tilted toward the outside. The cage partitions are secured to the floor wire mesh and are attached to the curtain wall and the cage support rod to essentially form the cages. Suitable feed and water troughs are provided and doors are hung at the front of each cage section. Near the outer edge of the cage floor, a space sufficient for the passage of an egg is provided below the feed trough, and the edge of the floor is provided with an upwardly spring biased egg retaining gate. A portion of the gate extends below the floor surface. Thus, by pushing upwardly on the under edge of the egg gate, the entire gate is caused to pivot downwardly, releasing the eggs into a collection tray.

A novel carriage arrangement is provided for use with the present egg layer system. The carriages can be arranged to provide a single service function or all of the service functions of egg collection, dropping board scraping and elevated working platform. For each carriage, two pairs of flanged wheels are arranged and disposed on axles to support a carriage chassis. The carriage chassis is arranged to straddle the open aisle between the cages, and the wheels are positioned to ride upon the wide structural beam flange providing support for the cage columns. Each carriage includes a power unit which can be self-contained or connected to an outside source of energy. Upwardly extending structures mounted on the chassis of the carriage engage a longitudinal guide rail centrally located at the upper end of the cage aisle.

Outwardly extending arms can be provided for scraping the dropping boards. These arms can be arranged in various patterns, such as a parallel, staggered length arrangement aiming forwardly in the forward direction of movement of the carriage, with a secondary or reverse arm extending outwardly in the opposite direction for scraping and cleaning the dropping boards of any residual matter as the carriage is returned along the aisle.

An egg collection tray can be provided for each tier of cages, with outwardly extending rollers provided on the sides of the trays for pivotally moving the egg retaining gates provided at the edges of the floor sections of the cages. Devices are also provided along the edges of the trays for urging the upward pivot and return of the gates to their egg retaining position after the eggs have been removed. The egg collecting carriage is then moved to one end of the aisle, where the eggs are transferred to a suitable egg conveying arrangement for transferring the eggs to a processing area.

In addition, a carriage may be provided which has an elevated work platform and supporting seat for an operator. A multi-platform storage cart can also be coupled in tandem to the servicing carriage for carrying individual cages of poultry for initially supplying the cages of the egg layer system or removing birds from the egg system. Various feed and water arrangements can also be provided with the present invention, but since these devices are old and well known, these are not intended to be a part of this invention.

Other objects and features of this invention will appear in the following description and appended claims, reference being made to the accompanying drawings forming a part of the specification, wherein like reference characters designate corresponding parts in the several views.

Figure 1:
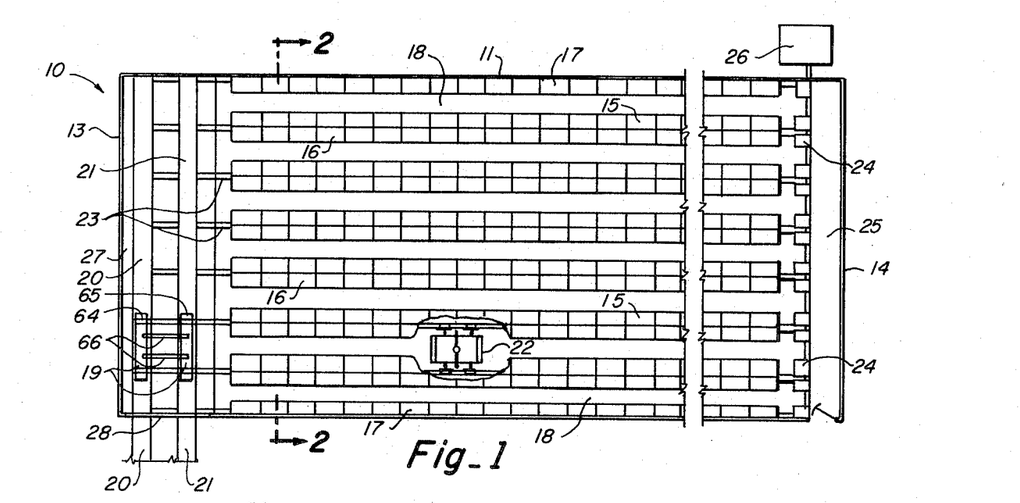
FIG. 1 is a top plan view of an egg layer system according to the present invention, which shows the plurality of rows of double cages, with the carriage device positioned in one aisle between the rows of cages and the trolley device is shown at one end of the cage rows.
Figures 2, 8:
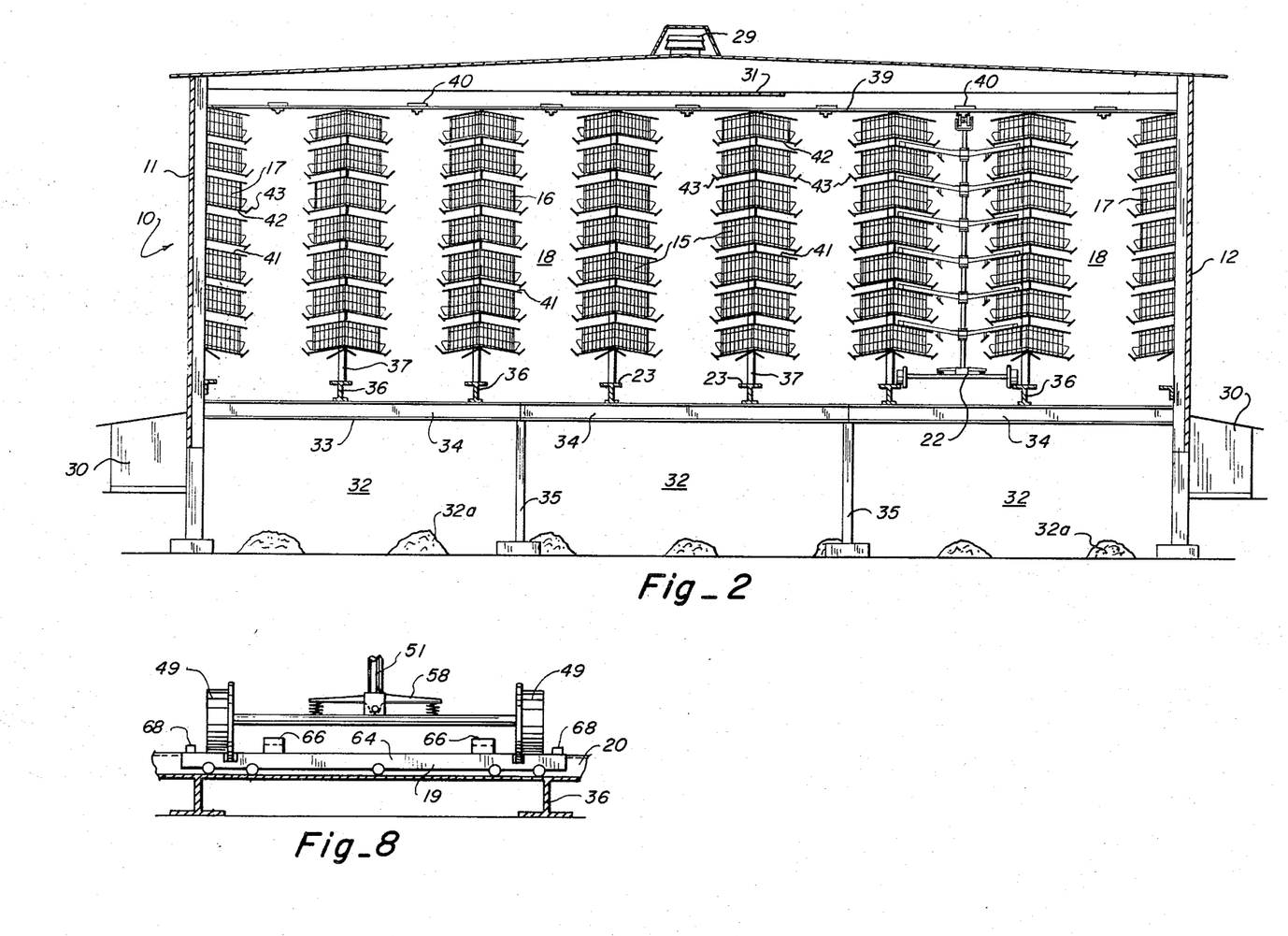
FIG. 2 is a cross section of the egg layer system according to this invention taken along the lines 2—2 of FIG. 1.
FIG. 8 is a side view of the trolley device showing the chassis portion of a carriage mounted thereon and the trolley channel partially cut away.

Turning now more specifically to the drawings, FIGS. 1 and 2 show the over-all view of the egg layer system according to this invention. In FIG. 1 is seen the enclosure building 10 having sidewalls 11, 12 and end walls 13, 14. Arranged within the building are interior rows 16 and outer rows 17 of poultry cages 15. The interior cage rows 16 are arranged parallel to the longitudinal axis of the building 10 and are of a double-cage type having a common rear wall. Along the inside surface of the sidewalls 11, 12 are arranged single cage rows 17 supported on the sidewall structure of the building. Aisles 18 having a consistently equal width are provided between the rows 16 and 17 of the cages 15. Transverse to the ends of the aisles 18 and along one end of the building 10 is a trolley device 19 having guide channels or rails 20, 21. A servicing carriage 22, as shown in the partially cutaway section of FIG. 1, is arranged to move along the entire length of the aisles 18. Rails 23 formed at the base of the rows of cages provide support and guidance for the movement of the carriage 22. At the opposite end of the building 10 from the trolley device 19 is located water and feed conveying devices 24 for supplying feed and water to the rows of cages. Adjacent to the feed hopper mechanism is a walkway 25 arranged along the end wall 14. A bulk feed storage supply hopper 26 can be provided at the outside of the building to supply feed for the individual feed conveying devices.

The trolley device 19 is provided for shifting the carriage 22 into positional alignment with any of the aisles 18 for the purpose of servicing the cages facing the aisle. The carriage 22, as will be described later, is provided for performing the egg collecting function from the individual cages and transporting the eggs to an egg conveying device 27 arranged along the end wall 13 of the building. Another function of a similar carriage 22 is to provide the scraping of the manure dropping boards provided below each of the cage tiers and the dumping of the manure into the pits below the aisles 18. An additional function is provided by a separate carriage 22 for the purpose of providing access to the individual cages by means of a height adjustable work platform which can be raised into position adjacent to any of the tiers of cages. This invention is also intended to include the provision of a single carriage which can combine all of the functions stated above into one unit which performs any of the functions desired at any time.

An access door 28 is provided in the sidewall 12 of the building 10 for the extension of the trolley guide channels 20, 21 to other similar buildings and egg layer systems, whereby the carriages 22 can be interchanged with other similar systems or the carriage can be used in more than one system, if desired. It is to be understood that this feature also includes the possibility of both sidewalls of the building being opened by means of access doors 28, so that the carriage can be moved in either direction and possibly stored in a separate building until needed. As shown in FIG. 2, suitable air ventilators 29 and circulation and ventilation fans 30 can be provided on the top and sides of the building, respectively, as desired. An air deflector 31 positioned directly under the roof ventilator can be provided to deflect the incoming air and prevent drafts from being directed onto the poultry cages. The use of ventilators, circulation fans and air conditioning equipment for servicing the air within the egg layer enclosure building is well known in the art and does not constitute part of this invention.

As shown in FIG. 2, an open manure collecting pit 32 can be provided for the collection of the manure 32A scraped from the dropping boards of the poultry cages. This approach is commonly used in the poultry industry and it has been found that, by positioning the fans 30 adjacent to the pit area, air can be drawn across the manure to maintain it in a dry state, where it can be stored for a considerable length of time up to several years.

The manure collecting pit 32 provided in the present invention is accomplished by elevating the support structure 33 for the rows of tiered cages 16 above the floor of the pit 32. Structural beams 34 are supported transversely across the building by means of columns 35. Longitudinal beams 36 are equi-spacedly positioned across the width of the building and provide the support for the cage support columns 37. The top flange of the cage support beams 36 is designed to have a width of approximately 10 to 15 inches which can be provided by extending the width of the flange 36 or welding an additional continuous plate to the top of the beam to provide an outwardly extending shelf or guide rail support for the servicing carriages 22. Along the inside surfaces of the sidewalls 11, 12 are mounted inverted wide-flanged structural angles 38 which are arranged at the same elevation as the upper flange of the support beams 36 to provide the rails for movement of the carriage 22 along the outermost aisles. The cage support columns 37 are arranged longitudinally spaced on the centerline of the support beams 36 to form the structure for the poultry cages 15. The upper end of the cage columns 37 are tied together in a rigid framework by means of cross beams 39. Upper guide rails 40 are centrally suspended in each of the aisles 18 to the cross or lateral beams 39 and extend continuously in a longitudinal direction the length of the aisle 18. The upper guide rails laterally stabilize the carriage 22 to allow the carriages 22 to be centrally positioned during passage along the aisle 18.

In the enclosure building 10 provided in this embodiment, it has been found that a width of approximately 50 feet is suitable to provide the optimum air ventilation and environmental control within the building. Although the length of the building can be of any dimension desired, it has been found that a length of approximately 140 feet is suitable for satisfactory operation. The height of the building, as shown in FIG. 1, can be 18 feet above the top of the foundation sidewalls which leaves a clearance of 14 feet above the beams 34 to the top of the uppermost cage, which, as shown in FIG. 2, provides seven tiers of poultry cages. A height of 8 feet or less is believed to be satisfactory for the manure collection pit 32.

As shown in FIG. 1, a width of 14 feet is provided between the end of the cage rows 16, 17 and the end wall 13 to provide clearance for the trolley device 19 and the egg conveyor mechanism 27. At the opposite end of the building a clearance of approximately 6 feet is provided for the installation of the feed conveying mechanism and the access walkway. It is to be understood that these dimensions may be varied as desired but an egg layer system, as provided in this invention, and the dimensions described herein are believed to produce a satisfactory operation.

Details of the cage construction will be described hereinbelow. For the present, however, it will be noted that the interior cage rows 16 include cages arranged back to back with the cages extending outwardly in a cantilevered fashion on either side of the cage support columns 37. The cages in each row are arranged in multiple tiers.

The roof of each cage tier is formed by a solid, continuous sheet material member which forms a dropping board to shield or protect the lower cages. The cage floor of each tier of cages is formed from open mesh wire and tilted downwardly toward the aisle facing the cages. The tilt of the cage floors is provided for allowing the eggs laid by the poultry to roll out of the cages to prevent cannibalism or damage to the eggs by the poultry. A sectionalized egg retainer gate is provided along the outer edge of the floor 42 of each cage 15. The dropping boards 41, as can be seen in FIG. 2, are arranged parallel to the sloping cage floor 42 immediately above, thus providing an open space for insertion of a dropping board scraper.

One of the major problems that has been found in egg layer systems of the prior art is the accessibility and the servicing of the cages, especially in a multiple tiered arrangement. In the present invention, servicing carriages 22 are provided and arranged to pass along the aisles between the cages for performing the various functions necessary. Three basic carriage arrangements are provided in this invention. It is to be understood that any type of carriages may be also added to perform additional functions that are required. In addition, as will be described later herein, all of the functions can be combined, if desired, into a single carriage for handling the many functions necessary.

FIGS. 3–7 show various carriage embodiments for performing the egg collection function, the dropping board scraping function and the cage servicing function, respectively.

Figure 3:
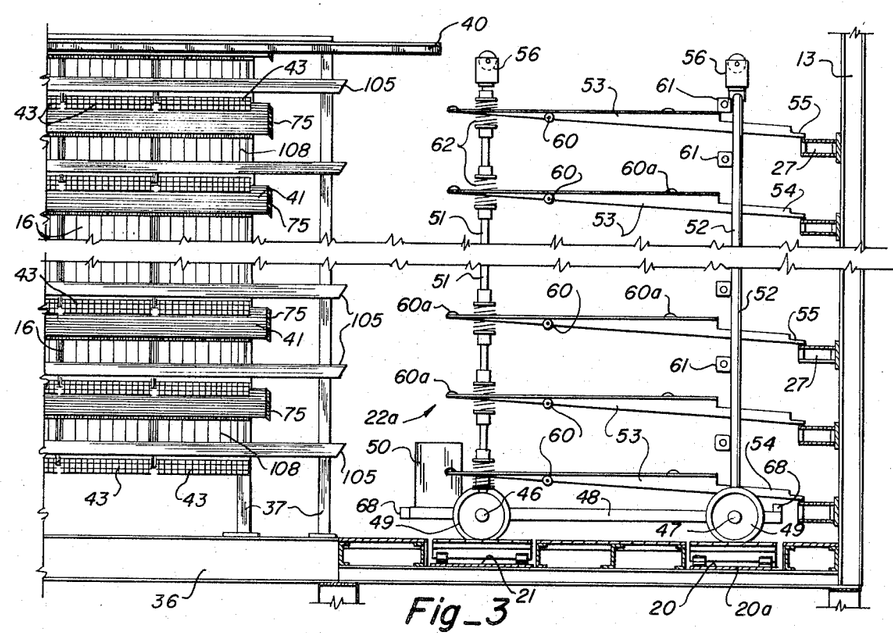
FIG. 3 is a partial sectional view showing a carriage positioned on the trolley and showing the egg collection trays in position for transferring eggs to the egg conveyors.
Figure 4:
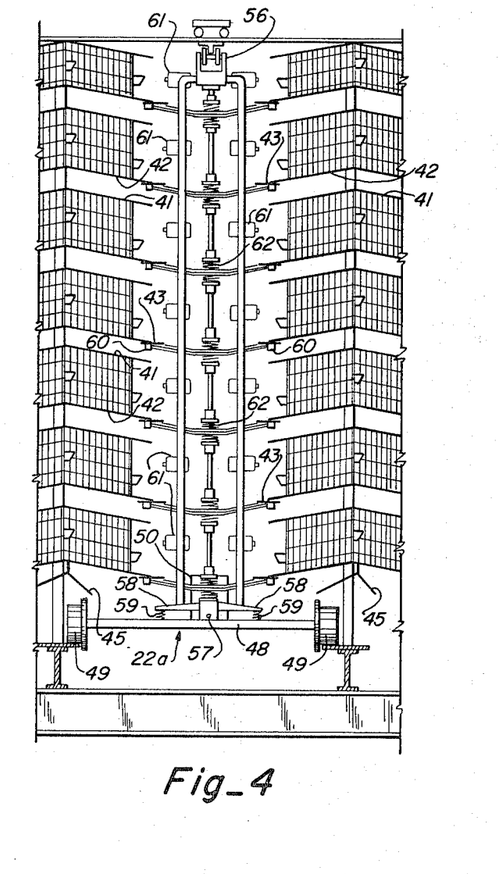
FIG. 4 is a partial end view showing the egg collection trays mounted on a carriage positioned within the aisle between rows of cages, the flanged wheels of the carriage ride on rails formed by the upper flange of the carriage support beams, and a center guide rail is provided at the top of the cage structure.

In FIGS. 3 and 4 is shown an egg collecting carriage 22a. Two axles 46, 47 are suitably mounted and extend through or under the carriage chassis 48. Flanged wheels 49 are rotatably mounted at the end of each of the axles 46, 47. A power drive unit 50 is mounted at one end of the chassis 48 and is drivingly connected to the flanged wheels 49 or to at least one of the axles, such as 46, for simultaneously driving both flanged wheels 49 fixedly attached to the shaft of axle 46. The drive connection to the wheels or axles can be made by any method desired, such as an endless chain and sprockets, hydraulic pump and motors attached to one or more wheels, direct shaft drive or the like. The power drive device 50 can be of any type desired, such as an internal combustion engine or a drive motor, such as an electric motor. The electrical connections for providing power to the electric motor can be provided by separate electrical busses, insulating the individual rails upon which the carriage rides or can be directly connected to a source of power by means of flexible cables. Although it may be preferred to provide an electric motor for the carriage drive, it is to be understood that any type of drive may be provided which would come within the purview of the present invention.

Mounted on the chassis 48 to extend vertically upwardly is a single support column 51 and a U-shaped double support column 52. As shown in FIG. 3, the carriage 22a moves ito the aisle between the cages in a direction moving toward the left. Thus, the end of the carriage 22a advancing into the aisle first is called the fore or front end. The single support shaft 51 is mounted toward the front end of the chassis 48 with the double shaft support column 52 mounted toward the rear. Egg collecting trays 53 which have a forward portion, the width of which coincides with the spacing between the front edges of the cage floors, are vertically spaced and mounted on the support shafts 51, 52. The rear portion 54 of the trays 53 is arranged to fit between the upwardly extending support shafts 52 and the end of the tray which extends past the support shaft 52 terminates in a suitable pivotal gate 55 which is arranged to open upon contact with the egg conveyors 27 provided along the end wall 13 of the building. The upper surface of the trays 53 is covered with a padded material, such as sponge rubber or plastic, to cushion the eggs and prevent damage. The trays 53 slope downwardly toward the middle from each lateral side, and the entire tray is tilted toward the rear whereby the eggs will roll and collect at the rear gate 55 of each tray. The upper end of each of the support shafts 51, 52 includes an upper guide roller 56. The entire tray support structure is mounted on a pivotal support 57 centrally on the carriage chassis 48. Laterally extending stabilizing arms 58 and springs 59 located under the ends of the stabilizing arms 58 allow the entire upper structure to be guided by the rail 40, permitting the structure to move longitudinally down the aisle 18 in correct position with respect to the plurality of cage tiers and independent of any slight elevational variations present in the rails 36. Novel roller devices 60 are provided along the outside edges of the trays 53 and are used to open or release the egg retainer gates provided on the edges of the cage floors. The construction and use of the rollers 60 will be explained further in the cage construction.

Since the egg collection function is the operation to be most often performed, cage scanning devices 61 can be mounted on the egg collecting carriage 22a, so as to provide continual visual monitoring of the egg production and condition of the poultry within the cages. These devices 61 can be mounted on the double shaft tray support structure 52 with a scanning instrument aimed outwardly at each tier of cages. A numbered placard can be attached to each cage door to identify the cages being monitored. The devices 61 can be scanning instruments, such as wide angle, closed circuit TV cameras and/or infra-red color scanning devices. With the use of infra-red scanning devices, it is possible to observe the physical condition of the birds, by means of comprising the relative body temperature of the birds within each of the cages. Thus, it is possible to determine if a certain bird or group of birds may be sick or diseased in time to remove these birds from the system before the condition can spread to the entire flock. The visual signal from the TV cameras or the infra-red sensors can be fed to color TV monitoring receivers provided in a remote control area whereby a single individual or computer can monitor the entire system of one or more cage layer operations.

The forward end of the egg collecting trays 53 can be slidably supported on the vertical shaft 51 by means of springs 62 positioned above and below the tray 53, so that the elevation of the tray can be slightly varied to coincide with the individual cage floors. The springs 62 can be relatively equal in compression to provide a floating effect at the forward end of the tray 53, while the other end of the tray can be supported pivotally on the upright support shafts 52 to provide a relatively fixed position vertically at this end. It is also possible that the rollers 60 can be arranged for vertical movement to compensate for the differences in the elevation between the trays and the cage floors, in addition to or instead of spring biasing the trays 53. An important feature of the present invention is the ability to provide accuracy in the positioning of the cage components so that only a minimum amount of adjustment is required in performing the various functions by the use of the servicing carriages.

As stated in more general terms above, a lateral trolley device 19 is provided across the width of the building 10 at one end of the cage rows 15. A pair of recessed U-shaped channels 20, 21 having a flat bottom surface 20a and 21a, respectively are provided. Each of the support beams 36 with their wide top flange forming the guide rails for the carriage are extended outwardly into the trolley area, so that the carriages may be moved onto the trolley 19. The width between the trolley channels 20 and 21 is designed to correspond to the wheel base distance between the axles 46, 47 of the carriage. The trolley channels 20, 21 are notched at each of their intersections with the edges of the guide rails 36 to permit passage of the flange of the wheels 49 as the carriage moves onto the trolley 19.

The trolley 19 is formed by the two cars 64, 65 which are interconnected by the cross members 66. The cars 64, 65 are positioned in the trolley guide channels 20, 21, respectively. The cars are mounted on rollers or wheels 67 which have suitable bearings to permit the trolley to be easily moved along the guide channels. The trolley 19 can be moved by a separate power drive unit, such as an electric motor or the like, suitably connected to the wheels 67 or can be driven by the power unit 50 mounted on the servicing carriage by means of a suitable interconnecting drive shaft arrangement. It is also possible that an additional drive wheel (not shown) can be mounted on the chassis 48 of the servicing carriage extending transverse to the longitudinal axis of the carriage and aligned with one of the trolley guide channels 20, 21, so that the drive wheel can be lowered into contact with the surface 20a or 21a of either channel and used to move transversely the entire trolley 19 and carriage positioned thereon. If desired, the drive wheel could be aligned with a walkway or other suitable surface adjacent to the trolley channel. Another possible method of moving the trolley 19 may be by a suitable cable or chain extending the full width of the building and driven by a capstan and drive motor.

For control of the operation of the servicing carriages and the trolley, so that a completely automated system may be obtained, suitable sensing devices 68, such as photoelectric cells, mechanical switches or the like, may be mounted on the carriage chassis and the trolley members 64, 65, or the rails themselves, to sense the movement and position of the carriage and trolley during their operation. Signals from the sensors 68 can be fed by any means desired, such as wires, cables or radio transmission, to a central control location to where they are introduced into a computer control device. Thus, the entire operation of the system, including the conveyance of the eggs to the processing area, the feeding and watering of the poultry and the movement and switching of the servicing carriages and their operation, can be automatically controlled with a minimum of personnel required.

A separate carriage 44b is provided for the scraping of the dropping boards in order to keep the cage area clean and free of sickness and disease. In the arrangement shown in FIG. 5, the carriage 44b is shown traveling on rails 70 formed by the wide flange angles welded to the sides of the cage support columns 37 a desired elevation above the foundation for the cage structure. In this embodiment, the cage support columns 37 are mounted directly on the concrete slab foundation 69 upon which the building structure 10 is built. The rail angles 70 are elevated at a sufficient height above the floor 69 of the building to allow a sufficient clearance below the carriage 22 for the accumulation of the manure scraped from the dropping boards of the cages. The manure may be allowed to accumulate in the aisle area and be removed by hand or by a tractor as desired. Another possible way of disposing of the manure deposited at the base of the aisles would be to have a plurality of conveyor belts arranged adjacent to the floor surface and longitudinally centered along each of the cage aisles so that, as the manure is scraped and deposited in the aisle, the movement of the conveyor may be initiated to carry the manure to an outside disposal area, or the manure can be deposited into carts which can be moved to the outside area. With the height of the system contemplated by the present invention, it would appear to be impractical to provide a cart below the carriage device, since the scraped manure would have a tendency to be scattered widely in its fall from the upper tiers of cages. It is also to be understood that, due to the elevated position of the carriage rails 70, the trolley structure also would be elevated a corresponding distance above the floor of the building to permit the transverse movement of the carriages as described above.

Figure 5:
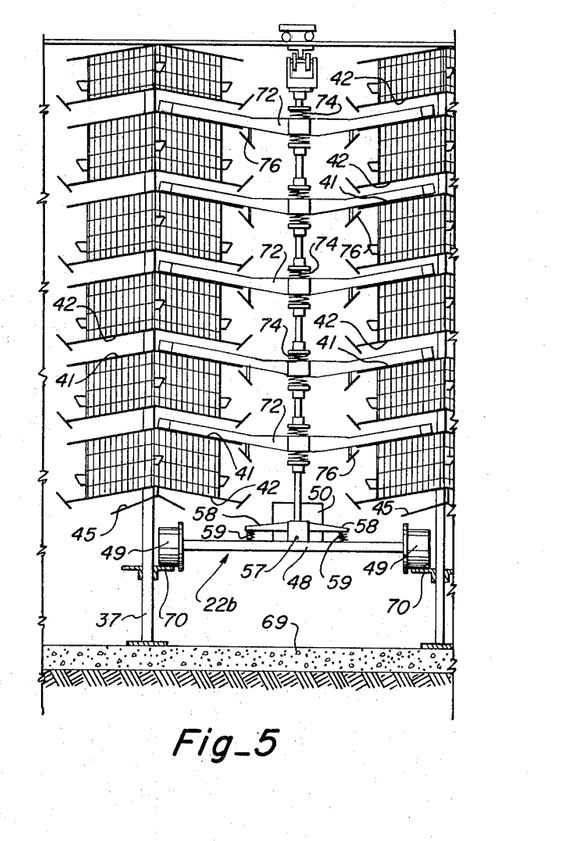
FIG. 5 is an end view of a cage aisle showing a carriage which includes scraper arms for scraping the dropping boards below each cage tier.

The carriage 22b arranged for the dropping board scraping function includes an identical base structure as described previously, for the egg collecting carriage 22a. Thus, the dropping board scraping carriage 22b includes the chassis 48, the two axles 46, 47 and the flanged wheels 49. A power drive unit 50 is mounted on the chassis 48 to move the carriage. A scraper arm support shaft 71 is mounted to extend in an upward vertical direction from the pivotal support 57 having stabilizing arms 58 biased by the springs 59. Outwardly extending scraper arms 72 extend in lateral, opposite directions from each side of the support shaft 71 and are arranged to extend upwardly at a slight angle so as to be parallel with the dropping boards 41 and fit the opening between the dropping boards 41 and the cage floors 42. The number of arms and the vertical spacing between the arms is designed to correspond with the dropping boards 41 provided between the tiers of cages. As can be seen in FIG. 5, a dropping board is not provided below the bottom most cage and a shield 45 is only provided below this cage to protect the carriage guide rails. Although the roof or cover of the uppermost cages is also formed as a dropping board 72, it is obvious that no scraper arm is needed for this member. A board is provided in this location primarily as a construction expedient to provide uniformity of parts in the construction. The scraper arms 72 are slidably positioned between mounting springs 74 having the same general compression force, so that the arms 72 are essentially floating in a vertical direction to provide for any misalignment in the elevation of the dropping boards. The end 75 of the dropping boards 41 at the end of the cage rows are angled downwardly in order to provide a guiding platform for the scraper arms 72 as the carriage 22b enters the aisle between the cages 15. A deflector 76 is mounted under each side of the scraper arms 72 and angled downwardly toward the center of the aisle. The deflectors 76 are arranged to underlap the corresponding dropping board 41 so that the manure scraped from the board 41 will be deflected toward the center of the aisle 18 instead of dropping on the eggs or feeder troughs below. The scraper support shaft 71 and the attachment device for the mounting of the scraper arms 72 is necessarily required to have some arrangement to prevent the rotation of the arms during their use. Thus, a cross section of the shaft and its corresponding arm connector can be of a square or rectangular configuration or include a slot and key arrangement to prevent the rotation.

Figures 9, 10, 11, 12, 12A, 13, 14:
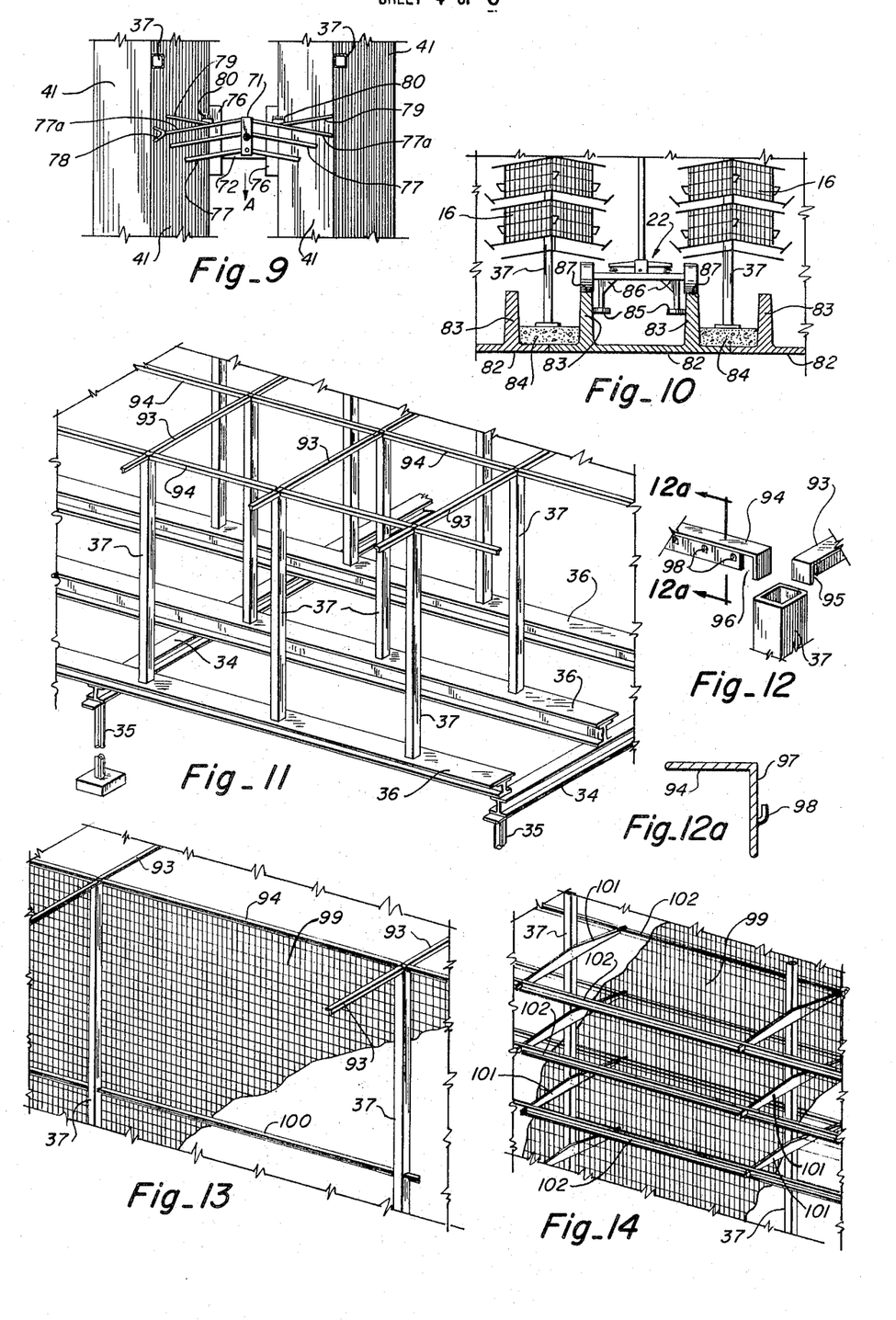
FIG. 9 is a top pictorial view of one of the dropping board scraper arm arrangements for scraping the dropping boards along both sides of an aisle as the carriage is moved therealong.
FIG. 10 is a pictorial view in partial section showing the foundation support for the rows of cages and carriage formed by inverting a series of elongated double-T, prestressed concrete beams.
FIG. 11 is a perspective view of the structural framework and the support columns for the egg layer cages.
FIG. 12 is an exploded perspective pictorial view of the attachment of the upper cross support members with the top of a cage support column.
FIG. 12A is a sectional view showing the hook arrangement for suspending the cage wire mesh curtain wall.
FIG. 13 shows a perspective pictorial view of the cage support columns with the curtain wall suspended along one side.
FIG. 14 is a pictorial perspective view of the curtain wall shown in FIG. 13 with the cross arms and cage hanger bars attached to the cage columns.

The scraper arms 72 include a plurality of outwardly extending scraper bars 77. A plurality of these scraper bars 77 are positioned parallel to each other and are angled in a forward direction, as shown by the arrow A, to provide additional rigidity during the scraping operation. The length of the scraping bars 77 is arranged to increase toward the rear so that the area scraped by the bars will be increased progressively as the carriage moves along the aisle. The length of the last bar 77a is arranged to extend the full depth of the dropping boards on either side of the aisle. Due to the construction of the cages, as will be described later, the dropping board along one side of the aisle which is on the left side, as shown in FIG. 9, covers the area including the cage support columns 37. Therefore, a flexible finger 78 is provided on the end of the bar 77a which corresponds with the side wherein the dropping board 41 surrounds the column 37. In this way, the entire surface of the dropping board 41 can be scraped clean by the movement of the scraper arm 77. If desired, a flexible finger 78 can be provided on both of the arms 77a to prevent any hangup in the scraper operation.

At the rear of the scraper arm 72 are mounted at least one pair of reverse scraper bars 79. The reverse scraper bars 79 are positioned outwardly from each side of the scraper arm 77a and angled in the opposite direction from the other scraper bars in that they are positioned toward the reverse direction of the carriage as it passes along the aisle. A brush 80 can be incorporated with the reverse scraper bars 79 to provide additional cleaning of any residue which may remain on the edge of the dropping boards 41.

Figures 15, 16, 17, 22:
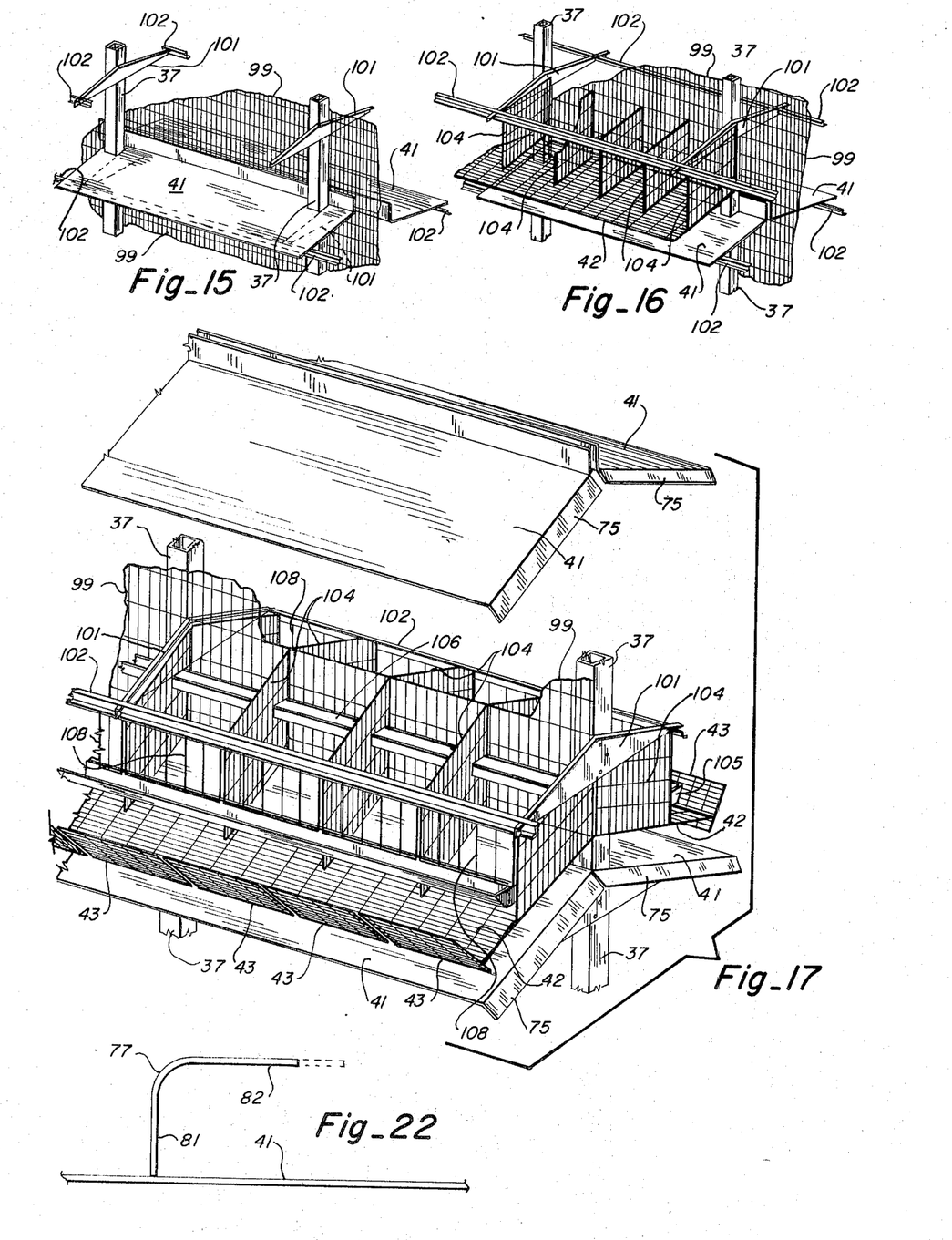
FIG. 15 is a pictorial perspective view of the arrangement shown in FIG. 14 with the dropping boards attached in position over the cross arms and cage hanger bars.
FIG. 16 is a pictorial perspective view of the cage arrangement shown in FIG. 15 with the floor and partition members shown in place.
FIG. 17 is a pictorial perspective view of the cages according to the present invention in assembled position with the upper cover or dropping board elevated to show the interior of the cages.
FIG. 22 is a cross sectional view of one arm of a dropping board scraper suitable for use in the present invention.

The scraper bars 77 may be formed from any suitable rigid material, such as metal or synthetic plastic, and can tke the shape of an angular cross section member, as shown in FIG. 22. The downwardly extending edge 81 rides in contact with the upper surface of the dropping board 41. A forwardly curved section 82 can be provided to scoop or direct the manure in the forward direction, as shown by the arrow, to contain and move the manure along the downwardly tilted dropping board 41 toward the outer edge. It is to be understood that any type of cross sectional configuration may be applied to the scraper bar 77, such as the arrangement illustrated, or a straight vertical member or curved member can be used. The upper surface of the dropping board 41 can also be coated to permit the easier removal of the manure from the surface. In addition, the edge of the scraper bar in contact with the surface of the dropping board can be serrated or grooved to break up and aid in the removal of the manure. It is also within the purview of this invention that brushes having wire bristles or stiff bristles can be used in place of the rigid scraper bars 77.

In FIG. 10 is shown another novel embodiment for the structural foundation for the cages and the rails for the servicing carriage. In this arrangement, prestressed double-T concrete beams 82 which are presently commonly available in the construction industry are used. These beams can be obtained in various lengths, such as 20, 30 or 40 feet, and include a flat plate or body 82a and outwardly extending and spaced legs 83. In the construction of this embodiment, the ground surface within the confines of the building enclosure 10 is smoothed and leveled. The double-T prestressed concrete beams 82 are inverted and laid side by side in parallel arrangement and aligned longitudinally. A reinforced concrete pad 84 is then cast to partially fill the area between the adjacent legs 83 and the edges of the plates 82a. This concrete pad 84 then forms a base support for the positioning and mounting of the spaced vertical columns 37 for the support of the cage rows. The two upwardly extending legs 83 which are precisely located during the casting process and which have a finished smooth outer edge 87 form the rails for the servicing carriage 22. The wheels 49a of the carriage can be either of the flanged configuration previously described, or can include guide rollers 85 mounted for rotation on structure 96 and extending downwardly along the edges of the carriage chassis 48. In this way, the wheels 49a of the carriage 22 are continuously guided along the upper edge 87 of the inverted T structure 82. In this embodiment, a completely functional base support structure for the cages and carriages can be economically formed at a remote location and installed quickly and easily at the final site. If desired, the trolley structure for use with this arrangement can be as described above, or the base for the trolley structure can be cast and formed in concrete at the site. In either arrangement, a suitable structural modification is required to allow the guide rollers 85 and the wheels 49a to move onto the trolley vehicle.

Figure 6:
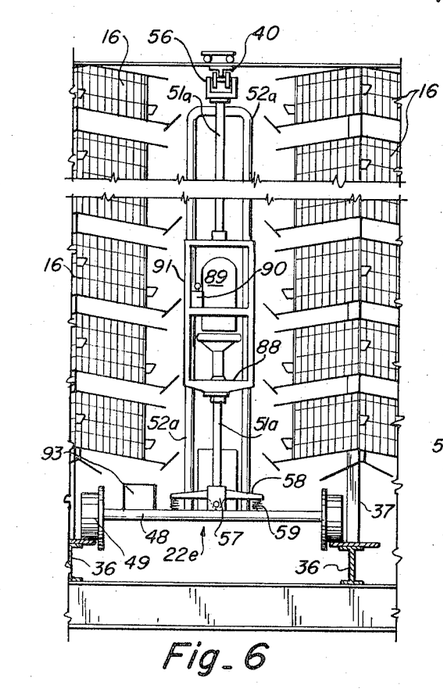
FIG. 6 is an end view of a cage row showing the carriage having a height adjustable work platform mounted thereon.
Figure 7:
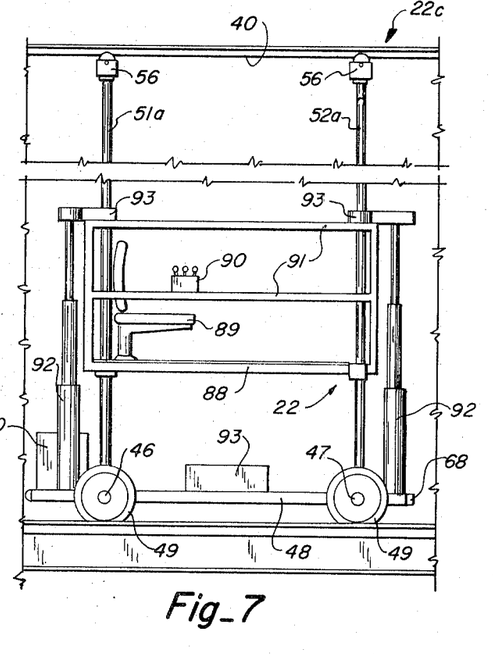
FIG. 7 is a side view of the carriage shown in FIG. 6.

Another novel form of carriage structure for servicing and providing access to the multi-tier rows of cages is provided by an elevated platform structure mounted on the carriage chassis 48 described above. In this embodiment, which is shown in FIGS. 6 and 7, the carriage 22 includes a chassis 48 mounted and supported upon axles 46, 47 and flanged wheels 49. A power drive unit 50, suitably connected to the wheels 49 of the carriage, is provided for moving the carriage along the rails 36. A single upwardly extending support shaft 51a and a double U-shaped shaft 52a are mounted on the chassis by the spring biased pivotal mounting supports 57, 58 and 59. At the top of the support shaft 51a and 52a are mounted guide rollers 56 which engage the center guide rail 40 when the chassis is moved along the aisle 18. A vertically positionable personnel work platform 88 having an operator's seat 89 and control levers 90 is slidably mounted on the support shafts 51a and 52a to allow access to any or all of the tiered cages. A safety guard rail structure 91 can be provided around the sides of the work platform 88, if desired. Telescoping cylinders 92 are provided at each end of the chassis 48 and are attached to the work platform 88 by means of brackets 93. Hydraulic cylinders would be suitable for this purpose and a hydraulic pump and a reservoir system 93a suitably connected to the drive motor 50 can be provided to power the cylinders 92. Thus, by use of the hydraulic system 93a and controls 90, the operator can position the work platform 88 at any elevation desired and move the carriage to any position along the aisles 18 provided in this system. The support shafts 52a are spaced apart so that the rear portion of the work platform 88 is left open so that an auxiliary carriage (not shown) can be connected in tandem to the carriage 22 and arranged to carry cages of poultry or other equipment that is needed in the servicing of the cages. Thus, the operator of the platform has clear and open access to the auxiliary carriage to make the servicing operation mroe convenient.

It is to be further understood that, as part of this invention, a single carriage having a similar chassis structure as described above can be provided which includes all of the structural features of the carriages described separately hereinabove so that a single carriage can perform all of the functions described. With this arrangement, it would be desirable to position the dropping board scraping assembly and work platform at the front of the chassis, while the egg collecting and retaining trays would be positioned towards the rear of the chassis to permit depositing of the eggs upon the conveyor arranged adjacent to the trolley device.

Another important feature of the present invention is the poultry cages and the method of constructing these cages. As shown in FIG. 11, cage support columns 37 are spacedly positioned along the longitudinal support beams 36. It has been found that these support columns 37 can be of tubular configuration having a rectangular or square, hollow cross section. A dimension of 3 or 4 inches on each side of the column has been found to be satisfactory. The height of these columns is determined by the number of tiers of cages necessary to produce the desired poultry density and egg production. A column having a dimension of 3 inches on each side has been found to be satisfactory for at least seven tiers of poultry cages. It has also been found that a longitudinal spacing of approximately 8 feet between the columns is sufficient to provide necessary cage structure rigidity. Lateral cross braces 93 and longitudinal cross braces 94 are arranged to interconnect the top ends of the support columns 37.

In this embodiment, the lateral and longitudinal cross braces 93, 94 are provided as structural members having an L-shaped cross section. The lengths of the braces 93, 94 are sized to fit the spacing between the columns 37. The ends 95, 96 of the cross braces 93, 94, respectively, are notched with the upper surface of the braces bent downwardly a short distance so that the ends can be inserted over the top edge of column 37. Merely inserting the ends 95, 96 of the cross braces 93, 94 into the column 37 is sufficient to brace the entire structure, but it is to be understood that a fastening device may be used to secure the members together, if desired. The downward extending side of the longitudinal cross brace 94 is arranged so that the outer surface 97 is positioned flush with one side of the vertical column 37. All of the column rows are arranged so that the outer surface 97 of the longitudinal cross braces 94 are aligned for the entire extent of the row. A plurality of upwardly extending hooks 98 are arranged along the length of each of the longitudinal braces 94. A curtain wall 99 formed from a single continuous sheet of material, such as open mesh wire fabric or solid material, is suspended along the entire length of the column row by means of the hooks 98 formed in the longitudinal cross braces 94. An additional longitudinal cross brace is provided near the base of the column 37 and arranged in horizontal position to secure the bottom edge of the curtain wall 99. The lower longitudinal member 100 can be similar to the configuration of the upper brace 94 except that the member is inverted so that the hooks face in a downward direction to secure the wire mesh. The member 100 is arranged to fit between the support columns 37 and can be attached to the columns by welding. It is intended that the length of the curtain wall 99 will extend below the floor elevation of the bottom tier of cages and the longitudinal member 100 is disposed so that the curtain wall 99 will be stretched tightly between the members 94 and 100. The ends of the curtain wall 99 are attached along their side edges to the end columns 37.

A plurality of cross arms 101 are inserted through the curtain wall 99 and are attached to the side of the vertical column 37 at their midsection by a fastening device, such as screws, bolts or blind rivets. As seen in FIG. 14, the cage cross arm 101 extends outwardly in a lateral direction from the column 37 and are arranged normal to the curtain wall 99. The arms 101 provide the lateral support for the double cage structure. The top edges of the cross arm 101 are arranged to extend downwardly from the support columns toward their outer ends. The plurality of cross arms 101, arranged on each column, are aligned horizontally to form the cage tiers and are spaced vertically to provide sufficient distance to provide a suitable height for the individual cage tiers and an open space between the tiers for the passage of the dropping board scraping arms. A vertical distance of 21–24 inches between the arms 101 is satisfactory.

Cage hanger bars 102 are attached to the cross arms 101 near their outer ends and are arranged to extend the full length of the rows. For ease in installation, the hanger bar 102 and the cross arm 101 can be suitably notched to receive each other so that the cage hanger bar 102 can be simply inserted into the end portion of the bar 101. The cage hanger bar 102 can be a single elongated member or can be fabricated from several sections joined together. For horizontal rigidity and support of the cages, it has been found that a double flanged "Z" cross section for the cage hanger bars 102 provides a rigid and stable structure.

A dropping board 41, which has an upwardly extending flange 41A at one edge, is positioned along the upper surface of each side of the cross arm 101 and along the upper surface of the hanger bar 102 positioned between the cross arms. Fastening devices 41b are used to secure the flanges 41a together on each side of the curtain wall 99. The surface of the dropping boards 41 also can be fastened to the hanger bar 102 by a series of blind rivets or fasteners which have a flush head along the upper surface of the dropping board to prevent interference with the scraping arms. The height of the flange 41a of the dropping boards 41 is intended to be of sufficient length to define the open space for the movement of the dropping board scraper arms and the egg retaining gates 43. In the present embodiment, the dimension of the flange 41a is approximately 6 to 8 inches.

Figures 18, 19, 20, 21:
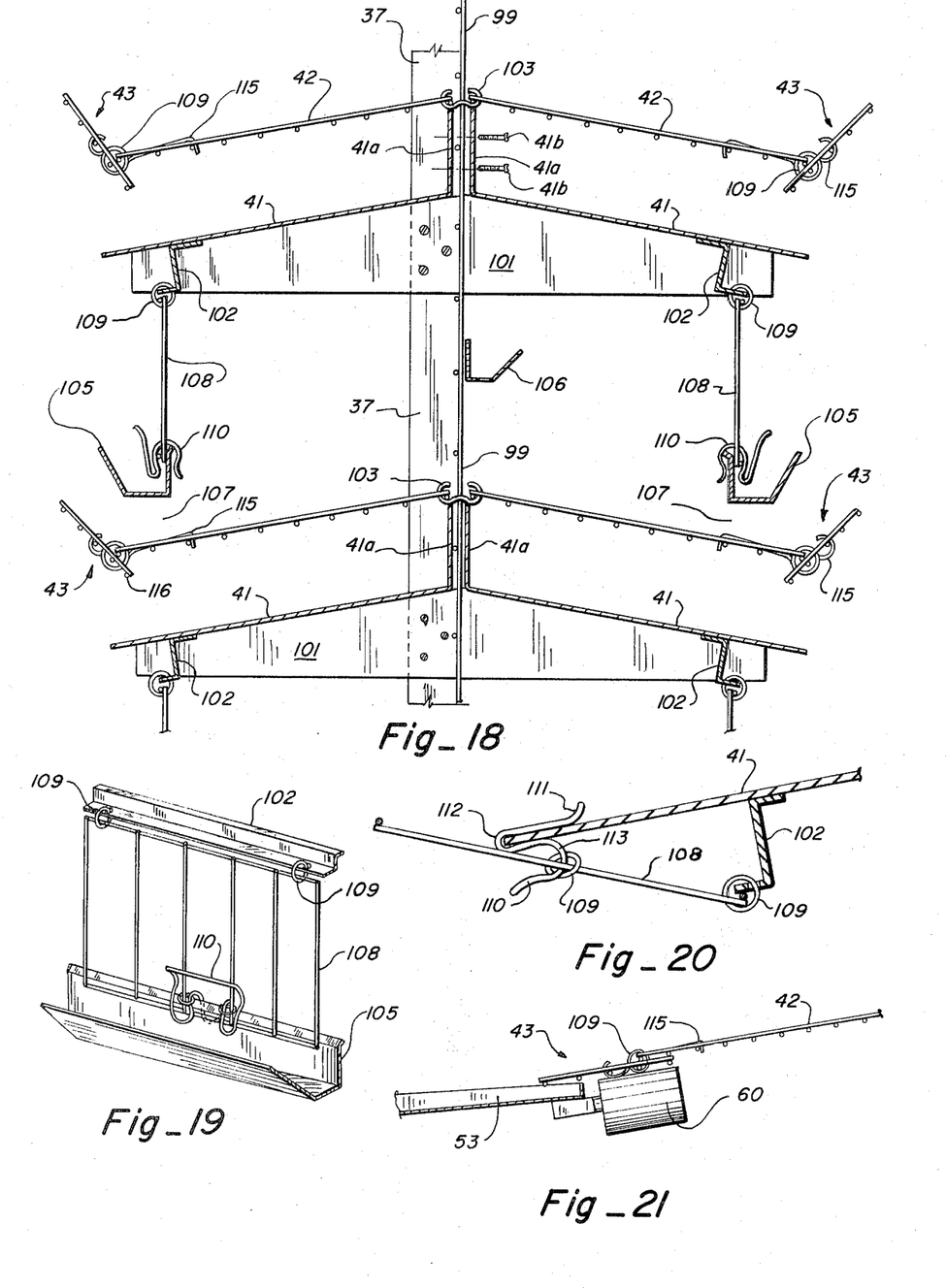
FIG. 18 is a partial end sectional view through one tier of cages showing the relative position between the cage elements; the cage partitions have been omitted for clarity.
FIG. 19 is a perspective view showing the cage door locking clip securing the door to the rear lip of the feed trough.
FIG. 20 is a partial end sectional view showing the cage door in the raised position and secured by the retaining clip to the edge of the dropping board.
FIG. 21 is a pictorial end view of the egg retainer gate shown pivoted in an outward and downward direction by a roller attached to the outer edge of the egg collection tray.

As shown in FIG. 18, a watering trough or water cups which are conventional can be attached to one or both sides of the curtain wall 99 for the full length of the cage row. With the open mesh curtain wall 99, a single watering trough may be used, since the poultry in the adjacent cage has access to the watering trough by inserting their heads through the wire mesh.

The floor 42 of the cages is arranged to extend outwardly and tilted downwardly. It is attached at the rear edge by means of a double ended clip arranged to pass through the curtain wall 99 and rest upon the top edge of the flange 41a. The center portion of the clip can be bent in a V-shape to rest upon the top edge of the flange 41a with the ends bent and crimped around the edge wire of the floor 42. A plurality of the clips are provided in spaced relation along the length of the edge of the floor 42 to properly secure the floors to the curtain wall 99. The floors 42 are arranged to extend continuous along the entire length of the cage tier and separate floor sections are provided on each side of the curtain wall 99. The wire used in forming the mesh used in the floor construction can be of a larger size to provide additional strength to support the weight of the poultry retained in each of the cages. The lateral wires forming the mesh are positioned on the top surface of the floor 42 and are arranged parallel so that the eggs laid on the slightly tilted floor, as shown in FIG. 18, will roll or slide easily toward the outer edge of the floor.

A plurality of cage wall partitions 104 are vertically positioned in each cage tier between the dropping board 41 and the floor 42. These partitions are spaced along the cage tier and define the individual cages 15. The openings in the wire mesh used to form the partitions 104 can be smaller to prevent the birds from disturbing the poultry in the adjacent cages. Due to the downwardly tilted arrangement of the dropping boards 41 and floor 42, the partitions are formed in a parallelogram arrangement so as to fit the space between the dropping board 41, the floor 42 and the curtain wall 99. The partition 104 is attached at its rear and bottom edges to the curtain wall 99 and the floor surface 42. The upper front corner of the partition is attached to the cage hanger bar 102 which supports the floor in a suspended position. Circular wire staples which can be crimped to form a closed ring having overlapping ends can be used throughout the construction of the cages to attach the various wire sections together and to the solid support members. Holes are drilled through the solid support members to accept the staples, where necessary. The floor 42 can also be supported in its angled position by means of a plurality of wires of suitable length extending between the floor and the cage hanger bar 102. The spacing between the partitions 104 can be of any dimension which is suitable to provide spacing for the desired number of birds in each cage. The dimension of approximately 20-24 inches between the partitions appears to be suitable.

A feed trough 105 can be arranged to extend continuously along the front edge of each tier of cages and can be suspended from the cage hanger bar 102 by means of a wire or bracket or can be attached to the front edge of the partition 104 at various locations along the feed trough. The feed trough 105 is positioned above the floor 42 to provide a space 107 therebetween to permit the passage of the eggs to the outside of the cage. As far as the feed trough 105 is concerned, it can be of any cross sectional configuration which is sufficient to retain an amount of feed to sustain the poultry confined within the cage. Feed can be distributed along the feed trough 105 by means of an endless conveyor chain or other device where the conveyors draw feed along the trough along one side of the tier and return it to the central feed hoppers by means of the feed troughs on the other side of the tier. Arrangements of this nature are well knwon in the art and do not form a part of this invention.

Individual cage doors having a width conforming to the spacing between the partitions 104 are suspended at their upper edge to the cage hanger bar 102 by means of ring staples 109. The height of the door 108 is designed to extend below the rear edge of the feed trough 105 and prevent the swinging of the door into the interior of the cage. The door 108 is formed from a series of parallel wires extending vertically downward and spaced to permit the head of the poultry to be extended for feeding at the trough 105.

A cage door locking clip 110 which is considered part of this invention is provided for securing the door in a downward position against the rear edge of the feed trough 105 and also secured in the up or open position by means of being inserted over the outer edge of the dropping board 41. The clip 110 is formed from an endless loop of wire bent as shown in FIGS. 19 and 20 so as to have the width encompassing two of the vertical wire members forming the cage door 108. Looking at the side of the clip 110, the front edge of the clip is formed as a handle 111 leading into a narrow U-shaped portion 112 and a hook portion 113. The width of the hook portion 113, when viewed from the front, is narrowed to pass between the vertical members of the door 108. Ring staples 109 which are similar to those used throughout the construction of the cage are used to attached the legs of the clip 110 to the vertical members of the door 108 so that the clip 110 can be slidably moved upward or downward along the wires of the door. In the closed or down position of the door 108, the hook portion of the clip 110 is inserted over the rear edge of the feed trough 105. By merely pulling outwardly and downwardly on the handle 111, the clip is released and the door can be moved to the open or up position. With the door in the up position, the clip can be slidably moved along the door 108 so that the U-shaped portion 112 of the clip can be inserted over the front edge of the dropping board 41 to retain the door 108 in the up position. In this manner, the doors can be either held in the closed position or held open to greatly aid servicing the cage, such as cleaning or inserting and removing poultry.

As mentioned previously in this specification, an egg retainer gate device 43 is provided at the outer edge of the floor 42 and is provided for retaining the eggs for later collection by the servicing carriage 22. In this embodiment, the egg retaining device 43 includes a gate 114 formed from a rectangular section of wire mesh. The width of the gate 114 can be approximately 6-8 inches, while the length is arranged to correspond with the width of the individual cages. Thus, a separate gate is provided for each cage. As shown in FIGS. 18 and 21, the wires forming the upper surface of the gates 114 are positioned to extend parallel in the same direction as the upper surface wires of the floor 42. In this way, the eggs are generally permitted to roll and slide along the surface of the gate. The gate 114 is attached to the outer edge of the floor 42 at a distance from the bottom edge of the gate 114 which is approximately 20-25 percent of the overall width. Ring staples 109 spaced along the gate are used to loosely attach the gate to the floor to permit free pivoting of the gate with respect to the floor surface. Several helically wound torsion springs are interconnected between the gate 114 and the floor 42 to bias the outer edge of the gate in an upward position, as shown in FIG. 18. Due to the fact that the gate 114 is pivotally attached to the edge of the floor at a point spaced from its bottom edge, an upwardly directed force positioned against the bottom edge will cause the upper portion of the gate 114 to pivot outwardly and downwardly until the bottom edge 116 is held against the undersurface of the floor 42. Thus, as the egg collecting tray 53 with its outwardly extending roller 60 is moved along the undersurface of the cage floors 42, the roller pushes against the bottom edge of the gate 114 causing the gate to pivot outwardly and downwardly, releasing the eggs and allowing them to roll or move onto the padded surface of the tray 53. Thus, egg collection by the servicing carriage is an automatic and swift operation, permitting egg collection as the servicing carriage is moved along the tiers of cages. If desired, it is also possible to include an upwardly extending projection spaced along the edges of the tray 53 at a point ahead of and behind the roller 60 to assure the upward pivot of the egg retainer gate after the roller 60 has passed.

The above cage construction has been directed to the interior cage rows 16 having the double cage arrangement. For the outer cage rows 17 along the building sidewalls 11, 12, a similar construction is used, but essentially cages are built along only one side of the curtain wall, so as to extend into the building along the inside surface of the building walls.

The building wall support columns can be used as the cage support columns 37 or separate columns 37 can be arranged along the wall structure. The curtain wall 99 can be a separate sheet of material, as described above, or the sheet material forming the building siding can serve as the curtain wall, if desired. If the siding is used, it would be preferable to insulate the inner surface of the siding to protect the poultry in the side cages from extreme heat and cold. In addition, a cover should be placed over the insulation to keep the birds from pecking and destroying the insulation.

For the side cages, the cross arms 101 have one end removed and the tiers of cages are formed along only one side of the curtain wall 99. In this way, the normally unused areas along the walls of the building 10 are completely utilized and the carriage operations are efficient in that the tiered cage rows are arranged on both sides of every aisle.

In the assembly of the cage structure described herein, instead of providing the components, such as the floor 42, partitions 104, cage hanger bars 102 and cage doors 108, as seperate components, it is possible to preassemble these units into sections which can be easily handled, such as 8 ft. lengths. These sections can then be simply inserted into the notches provided at the ends of the cross arms 101 and fastened to the curtain wall 99. In this way, the actual construction of the cage system can be greatly accelerated at the site of construction to further reduce the overall cost of building the system.

While an egg layer system has been shown and described in detail, it is obvious that this invention is not to be considered to be limited to the exact form disclosed and that changes in detail and construction may be made therein within the scope of the invention without departing from the spirit thereof.

What is claimed is:

1. A poultry cage assembly having a plurality of vertically stacked tiers and arranged in an elongated row, said cage assembly comprising:
   a. a plurality of vertical support columns spacedly arranged in a single longitudinal row,
   b. a continuous curtain wall means extending along one side of said row of columns and secured to said columns, said wall means being formed from sheet material and arranged to substantially cover the vertical height of said row of columns,
   c. cage support means having a plurality of horizontally disposed cross arms arranged to extend outwardly from said columns and normal to the plane of said curtain wall means, said cross arms being vertically spaced and secured to said support columns whereby the arms are horizontally aligned with corresponding arms to form horizontal tiers,
   d. said cage support means further including cage hanger bars interconnecting the outer edges of the horizontally aligned cross arms,
   e. cover means including a continuous sheet of solid material attached to the upper surfaces of said cross arms and hanger bars and arranged to extend the full length of said column row,
   f. floor means being formed from open mesh wire fabric and arranged to extend the full length of said column row, said floor means being attached to said curtain wall means and said hanger bar means so as to be tilted downwardly from said curtain wall means so that eggs laid upon the floor means will roll to the outside edge of said floor means, said floor means further including egg retaining means along the outer edge of said floor means to retain said eggs,
   g. partition means including a plurality of partition walls vertically arranged and attached to said support means and said floor means to divide the space along each tier between the cover means, curtain wall means and floor means into a series of individual cages, and
   h. door means pivotally attached to said support means to enclose said cages and retain poultry therewithin.

2. A poultry cage assembly as defined in claim 1, wherein:
   said cage door means includes a pivotally mounted cage door assembly supported along its upper edge by the roof portion of said cage,
   a feed trough means is mounted continuously along the tier of cages suitably spaced above said floor portion to permit eggs to pass under said feed trough means to accumulate at said egg retaining means, and
   said floor portion of each cage is tilted in a downwardly direction toward the outside of said cage so that the eggs laid by said poultry will roll toward said egg holding device with only enough velocity to remove the egg from said cage.

3. A poultry cage assembly as defined in claim 1, wherein:
   said cage door is secured in a downward position to an edge of said feed trough means by a removable wire locking clip, and
   said clip is arranged to slide upwardly on the wire of said cage door means so that the clip can be used to retain the door in an upward position by attaching to the outer edge of the cover means.

4. A poultry cage assembly as defined in claim 1, wherein:
   said egg retaining device is arranged to pivot outwardly and downwardly to permit the eggs to roll onto an egg collecting tray as it is moved past said egg retaining means, said egg collecting tray including a means to contact a portion of said egg retaining means to cause it to pivotally move to release said eggs.

5. A poultry cage assembly as defined in claim 1, wherein:
   said cross arms extend laterally outward in opposite directions from said support columns, and
   said cover, floor, partition and door means are provided on each side of said curtain wall means to form a double cage arrangement wherein the rear wall of each cage is formed by the common curtain wall.

6. A poultry cage assembly as defined in claim 1, wherein:
   a feed trough means is mounted continuously along the front portion of said cages and is spaced above said floor means to permit said eggs to pass under said feed trough means to accumulate at said egg retaining means.

7. A poultry cage assembly as defined in claim 1. wherein:
   said curtain wall means is formed from open mesh wire fabric.

8. A method of making a row of tiered poultry cages for use in an egg layer system comprising:
   a. arranging a longitudinal row of spaced vertical support columns, b. securing curtain means of open wire mesh continuously along one side of said row of columns, said curtain means being arranged to extend substantially the height of said columns, c. inserting cage support means through said curtain means so as to extend laterally outward in a horizontal position from said columns and securing said support means to said columns, said support means being arranged vertically in equally spaced relation and aligned horizontally to form a series of longitudinal tiers extending the length of the row of said columns, d. positioning and attaching a continuous sheet of material on the upper surface of each tier of cage support means along the row of columns so as to form a roof for said poultry cages and to protect the cage from manure drop by the poultry retained in the cages above, e. suspending a continuous sheet of open wire mesh from each tier of cage support means in a spaced position above the roof of the next lower tier of cages and securing one edge of said sheet along the curtain means so that the sheet forming the floor of the cages is tilted downwardly away from said curtain means, f. securing vertical open wire mesh partitions between said cage support means and said floor so as to horizontally divide the space between these elements into individual cage areas, and g. pivotally securing a cage door from said cage support means so as to close said individual cages for retaining poultry therein.

9. A method of making a row of tiered poultry cages as defined in claim 8, wherein:

said cage support means is arranged to extend horizontally outward in opposite directions from said columns and the cages are formed in tiered back to back relationship on each side of the curtain means.

10. A method of making a row of tiered poultry cages as defined in claim 8, wherein:

a continuous feeder means and watering means is secured adjacent to each tier of cages for sustaining the poultry retained therein.

* * * * *